(12) United States Patent
Kniesel et al.

(10) Patent No.: US 8,735,474 B2
(45) Date of Patent: May 27, 2014

(54) FLAME RETARDANT COMPOSITIONS WITH POLYMERIC DISPERSING AGENTS

(75) Inventors: Simon Kniesel, Heidelberg-Dossenheim (DE); Rudolf Pfaendner, Rimbach (DE)

(73) Assignee: BASF SE, Ludwigshafen (DE)

( * ) Notice: Subject to any disclaimer, the term of this patent is extended or adjusted under 35 U.S.C. 154(b) by 71 days.

(21) Appl. No.: 13/059,241

(22) PCT Filed: Aug. 20, 2009

(86) PCT No.: PCT/EP2009/060786
§ 371 (c)(1),
(2), (4) Date: Mar. 18, 2011

(87) PCT Pub. No.: WO2010/023155
PCT Pub. Date: Mar. 4, 2010

(65) Prior Publication Data
US 2011/0190428 A1    Aug. 4, 2011

(30) Foreign Application Priority Data

Aug. 27, 2008  (EP) ..................................... 08163029

(51) Int. Cl.
  *C08K 5/3492*  (2006.01)
  *C08K 5/5313*  (2006.01)
  *C08K 3/28*    (2006.01)
  *C08K 3/32*    (2006.01)

(52) U.S. Cl.
  USPC ........... 524/100; 524/126; 524/133; 524/135; 524/416

(58) Field of Classification Search
  USPC ..................... 524/100, 126, 133, 135, 416
  See application file for complete search history.

(56) References Cited

U.S. PATENT DOCUMENTS

| | | | |
|---|---|---|---|
| 3,915,777 A | 10/1975 | Kaplan | |
| 4,010,137 A | 3/1977 | Brady | |
| 5,210,120 A | 5/1993 | Cipolli | |
| 5,331,030 A | 7/1994 | Cipolli | |
| 6,031,032 A | 2/2000 | Horacek | |
| 6,207,736 B1 | 3/2001 | Nass | |
| 6,255,371 B1 | 7/2001 | Schlosser | |
| 6,365,071 B1 | 4/2002 | Jenewein | |
| 6,509,401 B1 | 1/2003 | Jenewein | |
| 8,221,658 B2 * | 7/2012 | Bauer et al. | ................... 252/609 |
| 2001/0005745 A1 | 6/2001 | Kersjes et al. | |
| 2003/0193045 A1 * | 10/2003 | Takeuchi et al. | ............. 252/601 |
| 2004/0049063 A1 | 3/2004 | Hoerold et al. | |
| 2005/0250885 A1 | 11/2005 | Mercx et al. | |
| 2006/0020064 A1 | 1/2006 | Bauer et al. | |
| 2009/0054592 A1 | 2/2009 | Keijzer De et al. | |
| 2010/0179258 A1 | 7/2010 | Sakata | |

FOREIGN PATENT DOCUMENTS

| | | |
|---|---|---|
| DE | 19614424 A1 | 10/1997 |
| DE | 19734437 A1 | 2/1999 |
| DE | 19737727 A1 | 7/1999 |
| EP | 0006568 A1 | 1/1980 |
| EP | 0484832 A1 | 5/1992 |
| EP | 0545496 A1 | 6/1993 |
| EP | 0617079 A2 | 9/1994 |
| EP | 0707036 A1 | 4/1996 |
| EP | 078599 A1 | 7/1997 |
| EP | 1070754 A2 | 1/2001 |
| EP | 1095030 A1 | 5/2001 |
| EP | 1396524 A | 3/2004 |
| EP | 1624015 A | 2/2006 |
| EP | 1772491 A | 4/2007 |
| EP | 2154201 A | 2/2010 |
| GB | 1468188 | 3/1977 |
| WO | 9739053 A1 | 10/1997 |
| WO | 0198401 A1 | 12/2001 |
| WO | 2005/116139 A | 12/2005 |
| WO | 2008/149892 A | 12/2008 |

OTHER PUBLICATIONS

Patent Abstracts of Japan 2005133059 A May 26, 2005.
Patent Abstracts of Japan 54040855 A Mar. 31, 1979.
English Language Abstract of EP 0006568 Jan. 9, 1980.

* cited by examiner

*Primary Examiner* — Kriellion Sanders
(74) *Attorney, Agent, or Firm* — Tyler A. Stevenson

(57) ABSTRACT

The invention relates to a flame retardant composition, wherein the following components: a) At least one flame retardant component selected from the group consisting of phosphinic acid salts and nitrogen containing compounds; and b) At least one polymeric dispersing agent selected from the group consisting of styrenemaleic acid anhydride copolymers, long chain carboxylic acid salts and aliphatic polyether substituted by acidic groups; and c) A polymer substrate; are present.

18 Claims, No Drawings

FLAME RETARDANT COMPOSITIONS WITH POLYMERIC DISPERSING AGENTS

The invention relates to flame retardant compositions which comprise a mixture of nitrogen containing compounds or salts of phosphinic acid and a selected polymeric dispersing agent.

Flame retardants are added to polymeric materials (synthetic or natural) to enhance the flame retardant properties of the polymers. Depending on their composition, flame retardants may act in the solid, liquid or gas phase either chemically, e.g. as a spumescent by liberation of nitrogen, and/or physically, e.g. by producing a foam coverage. Flame retardants interfere during a particular stage of the combustion process, e.g. during heating, decomposition, ignition or flame spread.

There is still an urgent need for flame retardant compositions with improved properties that can be used in different polymer substrates. Increased standards with regard to safety and environmental requirements result in stricter regulations. Particularly known halogen containing flame retardants no longer match all necessary requirements. Therefore, halogen free flame retardants are preferred, particularly in view of their better performance in terms of smoke density associated with fire. Improved thermal stability and less corrosion of manufacturing equipment are further benefits of halogen free flame retardant compositions.

Nitrogen-containing flame retardants, especially those based on melamine, have been known for a long time and are, in some cases, commercially available. Some of those melamine derivatives also contain phosphorus. Examples of publications relating to such flame retardants are, inter alia, EP-A-782 599, EP-A-1 095 030 and U.S. Pat. Nos. 4,010,137 and 3,915,777.

Combinations of nitrogen-containing flame retardants with flame retardants based on phosphorus compounds are also known. In that respect, particular reference is made to, for example, DE-A-197 34 437, DE-A-197 37 727, WO-A-97/39053, EP-A-1 070 754, EP-A-6568 and DE-A-196 14 424. Particular phosphates and phosphinates in combination with nitrogen-containing compounds are also known as flame retardants, for example from EP-A-484 832, EP-A-545 496, EP-A-707 036, WO-A-01/98401, GB-A-1 468 188 and EP-A-617 079.

There is a continuing need for flame retardants that have improved thermal and mechanical properties and that can be used in various polymer substrates.

It has surprisingly been found that the mechanical properties and/or the flame retardant efficacy of flame retardant compositions can be improved by the addition of selected dispersants based on fatty acids, fatty amines, maleic acid anhydrides polymers and copolymers thereof.

The present invention relates to a composition, particularly a flame retardant composition, comprising
a) At least one flame retardant component selected from the group consisting of phosphinic acid salts and nitrogen containing compounds; and
b) At least one polymeric dispersing agent selected from the group consisting of styrene-maleic acid anhydride copolymers, long chain carboxylic acid salts, long chain carboxylic amines and aliphatic polyether substituted by acidic groups; and
c) A polymer substrate The compositions according to the invention attain the desirable V-0 rating, according to UL-94 (Underwriter's Laboratories Subject 94) and other excellent ratings in related test methods especially in polyamide glass fiber reinforced compositions where conventional flame retardants tend to fail.

The compositions according to the invention are characterized by favourable flame retardancy in combination with mechanical characteristics. In the context of the description of the invention, mechanical stability is defined as the ability to withstand mechanical stress caused by tensile, bending or impact.

The compositions, as defined above, comprise the following components:

Component a)

The term salt of phosphinic acid comprises within its scope preferably a metal salt, for example an alkali metal or alkaline earth metal salt, e.g. the sodium, potassium, magnesium or calcium salt or the iron(II), iron(III), zinc or boron salt.

According to a preferred embodiment, the composition comprises the aluminium salt of phosphinic acid.

According to an alternative embodiment, the term salts comprises non-metallic salts, e.g. the acid addition salts obtainable by reaction of phosphinic acid with ammonia or amines, e.g. the $(C_1\text{-}C_4\text{alkyl})_4N^+$, $(C_1\text{-}C_4\text{alkyl})_3NH^+$, $(C_2\text{-}C_4\text{alkylOH})_4N^+$, $(C_2\text{-}C_4\text{alkylOH})_3NH^+$, $(C_2\text{-}C_4\text{alkylOH})_2N(CH_3)_2^+$, $(C_2\text{-}C_4\text{alkylOH})_2NHCH_3^+$, $(C_6H_5)_4N^+$, $(C_6H_5)_3NH^+$, $(C_6H_5CH_3)_4N^+$, $(C_6H_5CH_3)_3NH^+$ or the $NH_4^+$ salt.

Among the acid addition salts the ammonium, $(C_1\text{-}C_4\text{alkyl})_{1\text{-}4}$ammonium or (2-hydroxy-ethyl)$_{1\text{-}4}$ammonium, e.g. tetramethylammonium, tetraethylammonium or the 2-hydroxyethyl-trimethylammonium salt are particularly preferred.

The term phosphinic acid comprises within its scope derivatives of phosphinic acid, $H_2P(=O)OH$, wherein one or two hydrogen atoms, which are directly attached to the phosphorus atom, have been substituted by organic substituents, particularly $C_1\text{-}C_6$alkyl, aryl, e.g. phenyl, aryl-$C_1\text{-}C_4$alkyl, e.g. benzyl or 1- or 2-phenethyl, or $(C_1\text{-}C_4\text{alkyl})_{1\text{-}3}$aryl.

According to a preferred embodiment, suitable phosphinic acids are represented by the structural formulae

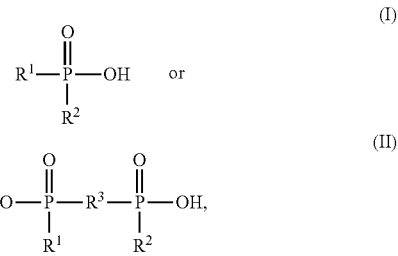

in which $R^1$, $R^2$ represents a linear or branched $C_1\text{-}C_8$alkyl radical, hydrogen, or a phenyl radical; and $R^3$ represents a linear or branched $C_1\text{-}C_{10}$alkylene, arylene, alkylarylene, or arylalkylene radical;

The term phosphinic acid comprises within its scope the tautomeric form $HP(OH)_2$, wherein the hydrogen atom which is directly attached to the phosphorus atom is substituted by an organic substituent, particularly $C_1\text{-}C_6$alkyl, aryl, e.g. phenyl, aryl-$C_1\text{-}C_4$alkyl, e.g. benzyl or 1- or 2-phenethyl, or $(C_1\text{-}C_4\text{alkyl})_{1\text{-}3}$aryl.

According to a particularly preferred embodiment, the salt of a phosphinic acid (I) is represented by the formula

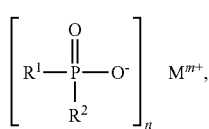
(I')

in which

R$^1$, R$^2$ represents a linear or branched C$_1$-C$_8$alkyl radical, or a phenyl radical, M represents (C$_1$-C$_4$alkyl)$_4$N, (C$_1$-C$_4$alkyl)$_3$NH, (C$_2$-C$_4$alkylOH)$_4$N, (C$_2$-C$_4$alkylOH)$_3$NH, (C$_2$-C$_4$alkylOH)$_2$N(CH$_3$)$_2$, (C$_2$-C$_4$alkylOH)$_2$NHCH$_3$, (C$_6$H$_5$)$_4$N, (C$_6$H$_5$)$_3$NH, (C$_6$H$_5$CH$_3$)$_4$N, (C$_6$H$_5$CH$_3$)$_3$NH, NH$_4$, an alkali metal or earth alkali metal ion, or an aluminium, zinc, iron or boron ion;

m is a numeral from 1-3 and indicates the number of positive charges on M; and n is a numeral from 1-3 and indicates the number of phosphinic acid anions corresponding to M$^{m+}$.

A highly preferred embodiment relates to a composition, wherein the salt of a phosphinic acid (I) is represented by the formula

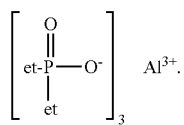

The composition according to the invention comprises as Component a) a flame retardant compound wherein at least one nitrogen atom is present. This flame retardant compound is present in the composition in combination with the phosphinic acid salts defined above or as an alternative thereto (and/or-relationship).

Suitable flame retardant compounds falling with the scope of the definition "flame retardant compound wherein at least one nitrogen atom is present" are selected from the group consisting of:

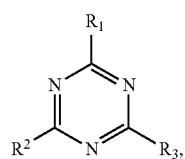
(III)

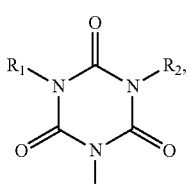
(IV)

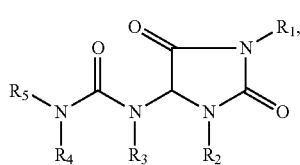
(V)

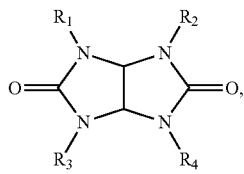
(VI)

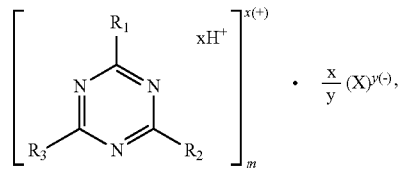
(VII)

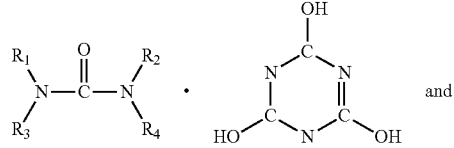
(VIII)

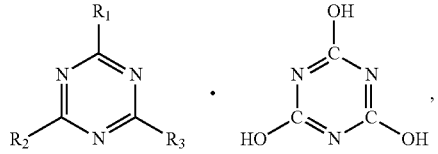
(IX)

Wherein in the compounds (III), (VII) and (IX):

R$_1$, R$_2$ or R$_3$ independently of one another represent substituents selected from the group consisting of C$_1$-C$_8$alkyl, C$_5$-C$_6$cycloalkyl and C$_1$-C$_4$alkyl-C$_5$-C$_6$cycloalkyl with hydroxy as an optional substituent; or represent substituents selected from the group consisting of C$_2$-C$_8$alkenyl, C$_1$-C$_8$-alkoxy, C$_2$-C$_8$alkenyl; C$_1$-C$_8$alkoxy, acyl, acyloxy, C$_6$-C$_{12}$aryl, —O—R$^1$ and —N(R$^1$)R$^2$, wherein R$^1$ and R$^2$ independently of one another represent hydrogen, C$_1$-C$_4$alkyl, C$_5$-C$_6$cycloalkyl, C$_2$-C$_8$alkenyl, C$_2$-C$_4$hydroxyalkyl or C$_6$-C$_{12}$aryl; or One of R$_1$, R$_2$ and R$_3$ represents hydrogen and two of R$_1$, R$_2$ and R$_3$ represent the substituents as defined above; or Two of R$_1$, R$_2$ and R$_3$ represent hydrogen and one of R$_1$, R$_2$ and R$_3$ represents a substituent as defined above;

X represents the anion of a protonic acid;

x is a numeral that represents the number of protons transferred from the latter to the triazine compound; and y is a numeral that represents the number of protons abstracted from the protonic acid;

provided that

In compounds (VII) one group is present that is capable of adding a proton; and

Compounds (III) are excluded, wherein R$_1$, R$_2$ and R$_3$ represent groups of the partial formula —N(R$^1$)R$^2$ and R$^1$ and R$^2$ represent hydrogen;

And wherein in the compounds (IV), (V), (VI) and (VIII):

R$_1$, R$_2$, R$_3$, R$_4$ and R$_5$ independently of one another represent hydrogen or substituents selected from the group consisting of C$_1$-C$_8$alkyl, C$_5$-C$_6$cycloalkyl and C$_1$-C$_4$alkyl-C$_5$-C$_6$cycloalkyl with hydroxy as an optional substituent; or represent substituents selected from the group consisting of C$_2$-C$_8$alkenyl, C$_1$-C$_8$-alkoxy, C$_2$-C$_8$alkenyl, C$_1$-C$_8$alkoxy, acyl, acyloxy, C$_6$-C$_{12}$aryl and —O—R$^1$, wherein R$^1$ represents hydrogen, C$_1$-C$_4$alkyl, C$_5$-C$_6$cycloalkyl, C$_2$-C$_8$alkenyl, C$_1$-C$_4$hydroxyalkyl or C$_6$-C$_{12}$aryl.

According to a preferred embodiment of the invention the composition comprises as Component a) at least one nitrogen compound selected from the group consisting of ammonium polyphosphate, melamine ammonium phosphate, melamine ammonium polyphosphate, melamine ammonium pyrophosphate, a condensation product of melamine with phosphoric acid and other reaction products of melamine with phosphoric acid and mixtures thereof.

The symbol X in formula VII represents, for example, an anion of phosphoric acid, polyphosphoric acid (linear or branched), pyrophosphoric acid, phosphinic acid, phosphonic acid or boric acid.

According to a preferred embodiment the composition comprises as Component a) compounds (III), (VII) and (IX), wherein $R_1$, $R_2$ or $R_3$ independently of one another represent substituents selected from the group consisting of $C_1$-$C_4$alkyl, cyclopentyl, cyclohexyl, methylcyclohexyl, $C_1$-$C_4$hydroxyalkyl, $C_2$-$C_6$alkenyl, $C_1$-$C_4$alkoxy, phenyl, phenyl, which is substituted by 1 to 3 substituents selected from the group consisting of methyl, methoxy and by halogen, —$OR^1$ and by —$N(R^1)R^2$, wherein $R^1$ and $R^2$ independently of one another represent hydrogen, $C_1$-$C_4$alkyl, hydroxy-$C_2$-$C_4$alkyl, cycloalkyl, methylcyclohexyl, phenyl or phenyl, which is substituted by 1 to 3 substituents selected from the group consisting of methyl, methoxy and by halogen.

According to a particularly preferred embodiment the composition comprises as Component a) compounds (III), (VII) and (IX), wherein one of $R_1$, $R_2$ and $R_3$ represents hydrogen and two of $R_1$, $R_2$ and $R_3$ represent the substituents as defined above; or two of $R_1$, $R_2$ and $R_3$ represent hydrogen and one of $R_1$, $R_2$ and $R_3$ represents a substituent as defined above.

According to another preferred embodiment the composition comprises as Component a) compounds (IV), (V), (VI) and (VIII), wherein $R_1$, $R_2$, $R_3$, $R_4$ and $R_5$ independently of one another represent hydrogen or substituents selected from the group consisting of $C_1$-$C_4$alkyl, cyclopentyl, cyclohexyl, methylcyclohexyl, hydroxy-$C_2$-$C_4$alkyl, $C_2$-$C_6$alkenyl, $C_1$-$C_4$alkoxy, phenyl, phenyl, which is substituted by 1 to 3 substituents selected from the group consisting of methyl, methoxy and halogen and by —$OR^1$ wherein $R^1$ represents hydrogen, $C_1$-$C_4$alkyl, hydroxy-$C_2$-$C_4$alkyl, cycloalkyl, methylcyclohexyl, phenyl or phenyl, which is substituted by 1 to 3 substituents selected from the group consisting of methyl, methoxy and halogen.

According to a particularly preferred embodiment the composition comprises as Component a) a nitrogen compound selected from the group consisting of benzoguanamine (formula III, $R_1$=phenyl, $R_2$=$R_3$=—$NH_2$), tris(hydroxyethyl) isocyanurate (formula IV, $R_1$=$R_2$=$R_3$=—$CH_2$—$CH_2$—OH), allantoin (formula V, $R_1$=$R_2$=$R_3$=$R_4$=$R_5$=H), glycoluril (formula VI, $R_1$=$R_2$=$R_3$=$R_4$=H), melamine phosphate, dimelamine phosphate, melamine pyrophosphate, melamine polyphosphate, melamine borate (all of formula VII type), urea cyanurate (formula VIII type), melamine cyanurate (formula IX type), melam or melem phosphate, melam or melem polyphosphate, ammonium polyphosphate and melamine ammonium phosphate, pyrophosphate and polyphosphate.

The nitrogen compounds as defined and described above are known compounds or are obtainable by known methods. Some of them are commercially available.

According to a particularly preferred embodiment the composition comprises as Component a) a nitrogen compound selected from the group consisting of compounds (VII), compounds (IX), ammonium polyphosphate, melamine ammonium phosphate, melamine ammonium polyphosphate, melamine ammonium pyrophosphate, a condensation product of melamine with phosphoric acid and other reaction products of melamine with phosphoric acid and mixtures thereof.

According to a highly preferred embodiment the composition comprises as Component a) a nitrogen compound selected from the group consisting of benzoguanamine, tris (hydroxyethyl)isocyanurate, isocyanurate, allantoin, glycoluril, melamine cyanurate, melamine phosphate, dimelamine phosphate, melamine pyrophosphate, urea cyanurate, melamine polyphosphate, melamine borate, ammonium polyphosphate, melamine ammonium polyphosphate, melamine ammonium pyrophosphate, the condensation product of melamine selected from the group consisting of melem, melam, melon and higher condensed compounds and other reaction products of melamine with phosphoric acid and mixtures thereof.

Special emphasis is given to dimelamine pyrophosphate, melamine polyphosphate, melem polyphosphate, melam polyphosphate, and/or a mixed polysalt thereof, particularly melamine polyphosphate.

According to a highly preferred embodiment the composition comprises as Component a) melamine cyanurate, such as the ones commercially available under the designation MELAPUR MC, MC 15, MC 25 or MC 50, or melamine polyphosphate such as the one commercially available under the designation MELAPUR 200.

According to a particularly preferred embodiment the invention relates to compositions, wherein component a) is present in an amount equal or higher than 1% by weight based on the total weight of the composition.

Component a) is admixed to the polymer substrate c) in concentrations of 0.05-35.0 wt. %, preferably 0.1-20.0 wt. %.

Component b)

A suitable polymeric dispersing agent consists of a polymeric chain and at least one so-called anchoring groups. The polymeric chain provides solubility properties within the polymer substrate as well as steric stabilization and determines the compatibility with the polymer system, whereas the anchoring group is connected with the flame retardant molecule itself.

Suitable polymeric dispersing agents are characterized by their effect of wetting solid flame retardant molecules, prevent viscosity buildup by dispersed flame retardant particles and prevent such particles from reflocculation.

Suitable polymeric dispersing agents are commercially available items e.g. under the product name SMA®Resins (Sartomer Corp.), such as the styrene-maleic acid anhydride copolymers which correspond to the general formula:

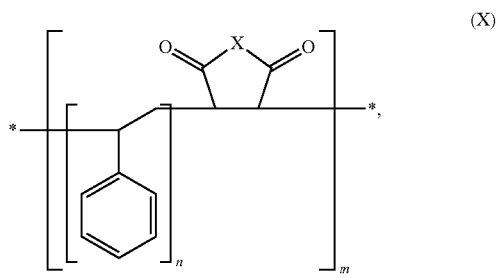

(X)

wherein —X— represents —O—, —NH— or —NR—, wherein R represents $C_1$-$C_4$alkyl or aryl, particularly phenyl, m is a numeral from 1-50 and n is a numeral from 1-5, particularly the product SMA® 1000P. This product is a low molecular weight styrene, maleic anhydride copolymer with an approximately 1:1 mol ratio.

Other suitable products are so-called styrene maleic anhydride copolymers, particularly the products SMA 1000F, 17352P, 2000F, 2000P, 2625F, 2625P, 3000F, 3000P, 3840F, 17352F, 1440, 17352H, 1000H, 2625H, 1440H, 1000H or 3000H or so-called styrene maleimide resins, particularly the products SMA 3000I, 4000I or 2000I.

According to an alternative embodiment, suitable polymeric dispersing agents are commercially available items under the product designation Ciba®EFKA® "Processing aids and surface modifiers for polymer systems", with a suitable molecular weight range is from 4 000-20 000.

A suitable product is an aliphatic polyether substituted by acidic groups, as represented by the formula

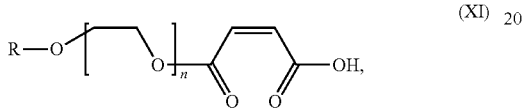 (XI)

Wherein R represents a $C_8$-$C_{18}$alkyl group and n represents a numeral from 5 to 10, such as the product EFKA®8530 (aliphatic polyether with acidic groups).

Other suitable products are
EFKA®5054 (High molecular weight carboxylic acid salt)
EFKA®8462 (Modified polyacrylate)
EFKA®8530 (Aliphatic polyether with acidic groups)
EFKA®8531 (Modified polyester)
EFKA®8532 (Acidic polyether)
EFKA®8533 (Modified polyether)
EFKA®8534 (Partial amide and salt of high-molecular weight unsaturated carboxylic acid)
EFKA®8536 (Polycarbonic acid-adduct, anionic)

The amount of Component b) present in the composition is not critical and may vary within broad ranges. According to a preferred embodiment, the amount of Component a) present in the composition is within a concentration range of 0.05-10.0 wt.-%, particularly 0.5-5.0 wt.-%.

The mixture of components a) and b) is added to the substrate of component c) in an amount of about 0.1-40.0% by weight, preferably 0.2-20.0% by weight.

Component c)

The term polymer substrate comprises within its scope thermoplastic polymers or thermosets.

A list of suitable synthetic polymers is given below:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different and especially by the following methods:
   a) Radical polymerisation (normally under high pressure and at elevated temperature).
   b) Catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, and amine or silyl ether groups. These catalyst systems are usually termed Phillips, Standard Oil Indiana, Ziegler-Natta), TNZ (DuPont), metallocene or single site catalysts (SSC).
2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).
3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norborene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.
4. Hydrocarbon resins (for example $C_5$-$C_9$) including hydrogenated modifications thereof (e.g. tackifiers) and mixtures of polyalkylenes and starch;
   The homopolymers and copolymers mentioned above may have a stereo structure including syndiotactic, isotactic, hemi-isotactic or atactic; where atactic polymers are preferred. Stereo block polymers are also included.
5. Polystyrene, poly(p-methylstyrene), poly(α-methylstyrene).
6. Aromatic homopolymers and copolymers derived from vinyl aromatic monomers including styrene, α-methylstyrene, all isomers of vinyl toluene, especially p-vinyl toluene, all isomers of ethyl styrene, propyl styrene, vinyl biphenyl, vinyl naphthalene, and vinyl anthracene, and mixtures thereof. Homopolymers and copolymers may have a stereo structure including syndiotactic, isotactic, hemi-isotactic or atactic; where atactic polymers are preferred. Stereo block polymers are also included;

a) Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

b) Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

c) Hydrogenated aromatic polymers derived from hydrogenation of polymers mentioned under 6a). Homopolymers and copolymers may have a stereo structure including syndiotactic, isotactic, hemi-isotactic or atactic; where atactic polymers are preferred. Stereo block polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulphochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1. above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes, which contain ethylene oxide as a comonomer; polyacetals modified with thermoplastic polyurethanes, acrylates or MBS.

14. Polyphenylene oxides and sulphides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide imides, polyether imides, polyester imides, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polyketones.

20. Polysulphones, polyether sulphones and polyether ketones.

21. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

22. Polycarbonates that correspond to the general formula:

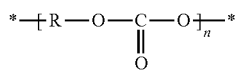

Such Polycarbonates are obtainable by interfacial processes or by melt processes (catalytic transesterification). The polycarbonate may be either branched or linear in structure and may include any functional substituents. Polycarbonate copolymers and polycarbonate blends are also within the scope of the invention. The term polycarbonate should be interpreted as inclusive of copolymers and blends with other thermoplastics. Methods for the manufacture of polycarbonates are known, for example, from U.S. Pat. Nos. 3,030,331; 3,169,121; 4,130,458; 4,263,201; 4,286,083; 4,552,704; 5,210,268; and 5,606,007. A combination of two or more polycarbonates of different molecular weights may be used.

Preferred are polycarbonates obtainable by reaction of a diphenol, such as bisphenol A, with a carbonate source. Examples of suitable diphenols are:

Bisphenol A:

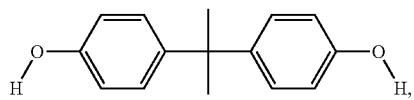

bisphenol AF:

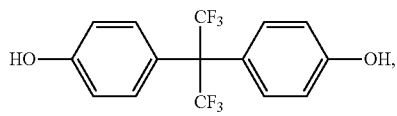

bisphenol AP;

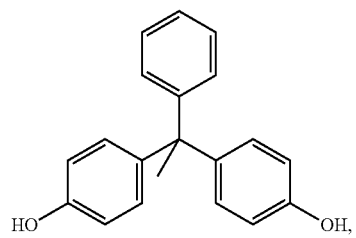

bisphenol B:

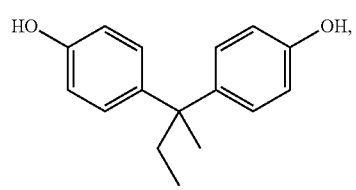 [SMILES: CCC(C)(c1ccc(O)cc1)c1ccc(O)cc1]

bisphenol C:

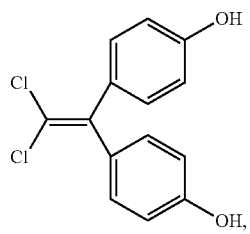 [SMILES: Oc1ccc(C(=C(Cl)Cl)c2ccc(O)cc2)cc1]

bisphenol E:

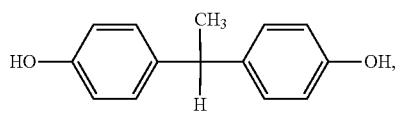 [SMILES: CC(c1ccc(O)cc1)c1ccc(O)cc1]

bisphenol F:

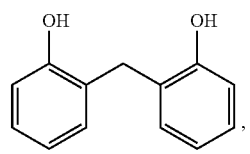 [SMILES: Oc1ccccc1Cc1ccccc1O]

bisphenol M:

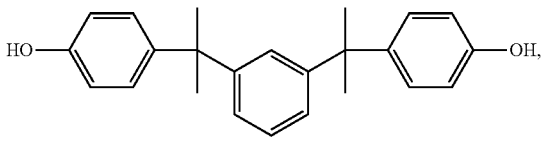 [SMILES: CC(C)(c1ccc(O)cc1)c1cccc(C(C)(C)c2ccc(O)cc2)c1]

bisphenol P:

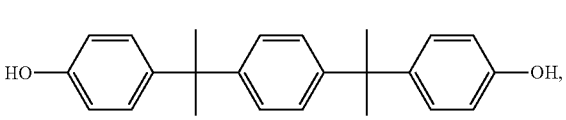 [SMILES: CC(C)(c1ccc(O)cc1)c1ccc(C(C)(C)c2ccc(O)cc2)cc1]

bisphenol S:

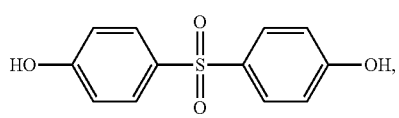

bisphenol TMC:

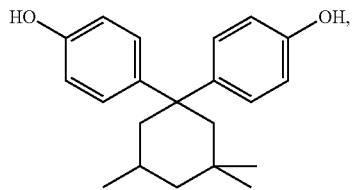

bisphenol Z:

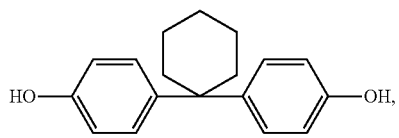 [SMILES: Oc1ccc(C2(c3ccc(O)cc3)CCCCC2)cc1]

4,4'-(2-norbornylidene)bis(2,6-dichlorophenol); or fluorene-9-bisphenol:

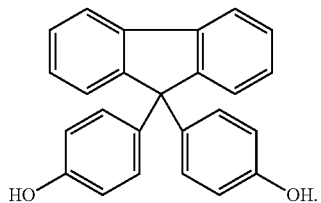 [SMILES: Oc1ccc(C2(c3ccc(O)cc3)c3ccccc3-c3ccccc32)cc1]

The carbonate source may be a carbonyl halide, a carbonate ester or a haloformate. Suitable carbonate halides are phosgene or carbonylbromide. Suitable carbonate esters are dialkylcarbonates, such as dimethyl- or diethylcarbonate, diphenyl carbonate, phenyl-alkylphenyl-carbonate, such as phenyl-tolylcarbonate, dialkylcarbonates, such as dimethyl- or diethylcarbonate, di-(halophenyl)carbonates, such as di-(chlorophenyl)carbonate, di-(bromophenyl)-carbonate, di-(trichlorophenyl)carbonate or di-(trichlorophenyl)carbonate, di-(alkylphenyl)-carbonates, such as di-tolylcarbonate, naphthylcarbonate, dichloronaphthylcarbonate and others.

The polymer substrate mentioned above, which comprises polycarbonates or polycarbonate blends is a polycarbonate-copolymer, wherein isophthalate/terephthalate-resorcinol segments are present. Such polycarbonates are commercially available, e.g. Lexan® SLX (General Electrics Co. USA). Other polymeric substrates of component b) may additionally contain in the form as admixtures or as copolymers a wide variety of synthetic polymers including polyolefins, polystyrenes, polyesters, polyethers, polyamides, poly(meth)acrylates, thermoplastic polyurethanes, polysulphones, polyacetals and PVC, including suitable compatibilizing agents. For example, the polymer substrate may additionally contain thermoplastic polymers selected from the group of resins consisting of polyolefins, thermoplastic polyurethanes, styrene polymers and copolymers thereof. Specific embodiments include polypropylene (PP), polyethylene (PE), polyamide (PA), polybutylene terephthalate (PBT), polyethylene terephthalate (PET), glycol-modified polycyclohexylenemethylene terephthalate (PCTG), polysulphone (PSU), polymethylmethacrylate (PMMA), thermoplastic polyurethane (TPU), acrylonitrile-butadiene-styrene (ABS), acrylonitrile-styrene-acrylic ester (ASA), acrylonitrile-ethylene-propylene-styrene (AES), styrene-maleic anhydride (SMA) or high impact polystyrene (HIPS).

According to a preferred embodiment, the polymer substrate of component c) is a polyamide or co-polyamide derived from diamines and dicarboxylic acids or aminocarboxylic acids or the corresponding lactams.

A further embodiment of the invention relates to a mixture comprising a) At least one flame retardant component selected from the group consisting of nitrogen containing compounds and salts of phosphinic acid; and b) At least one polymeric dispersing agent selected from the group consisting of styrene-maleic acid anhydride copolymers, long chain carboxylic acid salts and aliphatic polyether substituted by acidic groups.

A further embodiment relates to process for imparting flame retardancy to a polymer substrate, which process comprises adding to a polymer substrate the mixture as defined above.

Additional Components

The instant invention further pertains to a composition, which comprises, in addition to the components a) b) and c), as defined above, further additives selected from the group consisting of so-called anti-dripping agents, polymer stabilizers and additional flame-retardants, such as phosphorus containing flame-retardants, nitrogen containing flame-retardants, halogenated flame-retardants and inorganic flame-retardants.

According to a preferred embodiment the invention relates composition, which additionally comprises further additives selected from the group consisting of polymer stabilizers and additional flame retardants.

According to another embodiment, the invention relates to a composition which additionally comprises as additional component so-called anti-dripping agents.

These anti-dripping agents reduce the melt flow of the thermoplastic polymer and inhibit the formation of drops at high temperatures. Various references, such as U.S. Pat. No. 4,263,201, describe the addition of anti-dripping agents to flame retardant compositions.

Suitable additives that inhibit the formation of drops at high temperatures include glass fibers, polytetrafluoroethylene (PTFE), high temperature elastomers, carbon fibers, glass spheres and the like.

The addition of polysiloxanes of different structures has been proposed in various references; cf. U.S. Pat. Nos. 6,660,787, 6,727,302 or 6,730,720.

Stabilizers are preferably halogen-free and selected from phenolic antioxidants, nitroxyl stabilizers, nitrone stabilizers, amine oxide stabilizers, benzofuranone stabilizers, phosphite and phosphonite stabilizers, quinone methide stabilizers and monoacrylate esters of 2,2'-alkylidenebisphenol stabilizers.

Additional flame-retardants as of present component are known components, items of commerce or can be obtained by known methods.

Representative phosphorus containing flame-retardants, in addition to the ones defined above with regard to component a), are for example:

Tetraphenyl resorcinol diphosphite (FYROLFLEX® RDP, Akzo Nobel), tetrakis(hydroxymethyl)phosphonium sulphide, triphenyl phosphate, diethyl-N,N-bis(2-hydroxyethyl)-aminomethyl phosphonate, hydroxyalkyl esters of phosphorus acids, ammonium polyphosphate (APP) or (HOSTAFLAM® AP750), resorcinol diphosphate oligomer (RDP), phosphazene flame-retardants and ethylenediamine diphosphate (EDAP).

Nitrogen containing flame-retardants are, for example, isocyanurate flame-retardants, such as polyisocyanurate, esters of isocyanuric acid or isocyanurates. Representative examples are hydroxyalkyl isocyanurates, such as tris-(2-hydroxyethyl)isocyanurate, tris(hydroxy-methyl)isocyanurate, tris(3-hydroxy-n-proyl)isocyanurate or triglycidyl isocyanurate.

Representative organohalogen flame-retardants are, for example:

Polybrominated diphenyl oxide (DE-60F, Great Lakes Corp.), decabromodiphenyl oxide (DBDPO; SAYTEX® 102E), tris[3-bromo-2,2-bis(bromomethyl)propyl]phosphate (PB 370®, FMC Corp.), tris(2,3-dibromopropyl)phosphate, tris(2,3-dichloropropyl)phosphate, chlorendic acid, tetrachlorophthalic acid, tetrabromophthalic acid, poly-β-chloroethyl triphosphonate mixture, tetrabromobisphenol A bis(2,3-dibromopropyl ether) (PE68), brominated epoxy resin, ethylene-bis(tetrabromophthalimide) (SAYTEX® BT-93), bis(hexachlorocyclopentadieno)-cyclooctane (DECLORANE PLUS®), chlorinated paraffins, octabromodiphenyl ether, hexachlorocyclopentadiene derivatives, 1,2-bis(tribromophenoxy)ethane (FF680), tetrabromobisphenol A (SAYTEX® RB100), ethylene bis-(dibromo-norbornanedicarboximide) (SAYTEX® BN-451), bis-(hexachlorocycloentadeno)cyclooctane, PTFE, tris-(2,3-dibromopropyl)-isocyanurate, and ethylene-bis-tetrabromophthalimide.

The flame-retardant mentioned above routinely combined with an inorganic oxide synergist. Most common for this use are zinc or antimony oxides, e.g. $Sb_2O_3$ or $Sb_2O_5$. Boron compounds are suitable, too.

The above-mentioned additional flame-retardant classes are advantageously contained in the composition of the invention in an amount from about 0.5% to about 45.0% by weight of the organic polymer substrate; for instance about 1.0% to about 40.0%; for example about 5.0% to about 35.0% by weight of the polymer substrate.

As mentioned above, the composition according to the invention may additionally contain one or more conventional additives, for example selected from pigments, dyes, plasticizers, antioxidants, thixotropic agents, levelling assistants, basic co-stabilizers, metal passivators, metal oxides, organophosphorus compounds, further light stabilizers and mixtures thereof, especially pigments, phenolic antioxidants, calcium stearate, zinc stearate, UV absorbers of the 2-hydroxy-benzophenone, 2-(2'-hydroxyphenyl)benzotriazole and/or 2-(2-hydroxyphenyl)-1,3,5-triazine groups. More specific examples are the following components:

1. Antioxidants

Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

Tocopherols, for example α-, β-, γ-, δ-tocopherol and mixtures thereof (vitamin E).

Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulphide.

Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane.

O-, N- and S-benzyl compounds, for example 3,5,3',5'-tetra-tert-butyl-4,4'-dihydroxydibenzyl ether, octadecyl-4-hydroxy-3,5-di methyl benzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl) sulphide, isooctyl-3,5-di-tert-butyl-4-hydroxybenzylmercaptoacetate.

Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl) isocyanurate.

Benzylphosphonates, for example dimethyl-2,5-di-tert-butyl-4-hydroxybenzylphosphonate diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

Acylaminophenols, for example 4-hydroxylauranilide, 4-hydroxystearanilide, octyl N-(3,5-di-tert-butyl-4-hydroxyphenyl)carbamate.

Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, such as commercially available products like Irganox® 1076.

Esters of β-(5-tert-butyl-4-hydroxy-3-methylphenyl)progionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro [5.5]undecane.

Esters of β-(3,5-dicyclohexyl-4-hydroxyphenyl)progionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6, 7-trioxabicyclo[2.2.2]octane.

Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxylethyl)oxamide, 3-thiaundecanol, 3-thiapentadecanol, trimethylhexanediol, trimethylolpropane, 4-hydroxymethyl-1-phospha-2,6, 7-trioxabicyclo[2.2.2]octane.

Amides of β-(3,5-di-tert-butyl-4-hydroxyphenyl)progionic acid e.g. N,N'-bis(3,5-di-tert-butyl-4-hydroxyphenylpropionyl)hexamethylenediamide, N,N'-bis(3, 5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3, 5-di-tert-butyl-4-hydroxyphenyl]propionyloxy)ethyl] oxamide (Naugard®XL-1, supplied by Uniroyal).

Ascorbic acid (vitamin C)

2. Light Stabilisers 2-(2'-Hydroxyphenyl)benzotriazoles, for example 2-(2'-hydroxy-5'-methylphenyl)benzotriazole, 2-(3',5-di-tert-butyl-2'-hydroxyphenyl)benzotriazole, 2-(5'-tert-butyl-2'-hydroxyphenyl)benzotriazole, 2-(2'-hydroxy-5-(1,1, 3,3-tetramethylbutyl)phenyl)benzotriazole, 2-(3',5'-di-tert-butyl-2'-hydroxyphenyl)-5-chlorobenzotriazole, 2-(3'-tert-butyl-2-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3, 3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

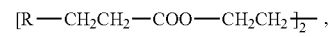

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole, such as commercially available light stabilisers from the Tinuvin® series, such as TINUVIN 234, 326, 329, 350, 360 or TINUVIN 1577.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, for example 4-tert-butylphenyl salicylate, phenyl salicylate, octylphenyl salicylate, dibenzoyl resorcinol, bis(4-tert-butyl-benzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis-(2,4-dimethylphenyl)-1,3,5-triazine, 2-[2-hydroxy-4-(2-hydroxy-3-butyloxypropoxy)-phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]-phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Further phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3",5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos 168, Ciba Specialty Chemicals), tris(nonylphenyl) phosphite,

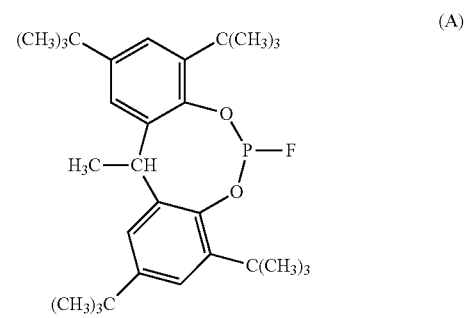

(A)

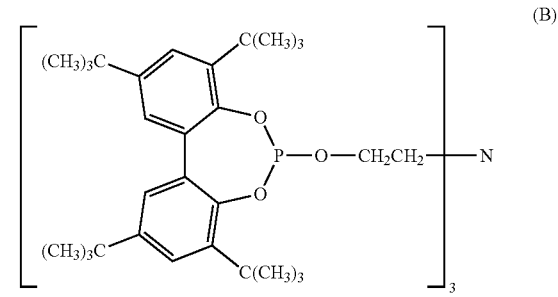

(B)

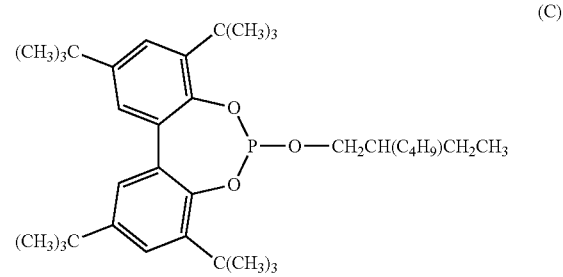

(C)

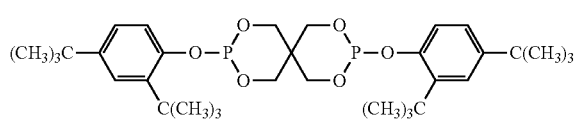

(D)

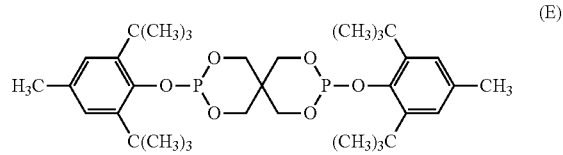

(E)

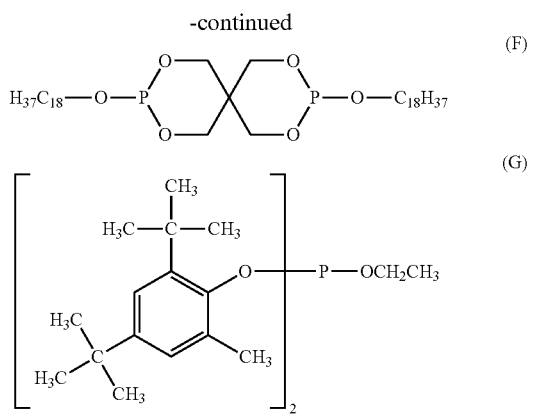

5. Further nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.
6. Thiosynergists, for example dilauryl thiodipropionate or distearyl thiodipropionate.
7. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulphide, pentaerythritol tetrakis(β-dodecylmercapto)propionate.
8. Polyamide stabilisers, for example copper salts in combination with iodides and/or phosphorus compounds and salts of divalent manganese.
9. Basic co-stabilisers, for example melamine, polyvinylpyrrolidone, dicyandiamide, triallyl cyanurate, urea derivatives, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.
10. Nucleating agents, for example inorganic substances, such as talcum, metal oxides, such as titanium dioxide or magnesium oxide, phosphates, carbonates or sulphates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.
11. Further fillers and reinforcing agents, for example calcium carbonate, silicates, glass fibres, glass bulbs, stainless steel fibres, aramide fibers, asbestos, talc, kaolin, mica, barium sulphate, metal oxides and hydroxides, carbon black, graphite, wood flour and flours or fibers of other natural products, synthetic fibres.
12. Other additives, for example blend compatibilizing agents, plasticisers, lubricants, emulsifiers, pigments, rheology additives, catalysts, flow-control agents, optical brighteners, flame proofing agents, antistatic agents and blowing agents.
13. Additional benzofuranones and indolinones, for example those disclosed in U.S. Pat. Nos. 4,325,863; 4,338,244; 5,175,312; 5,216,052; or 5,252,643; DE-A-4316611; DE-A-4316622; DE-A-4316876; EP-A-0589839 or EP-A-0591102 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

Preferred additional additives for the compositions as defined above are processing stabilizers, such as the above-mentioned phosphites and phenolic antioxidants, and light stabilizers, such as benzotriazoles. Preferred specific antioxidants include octadecyl 3-(3,5-di-tert-butyl-4-hydroxyphenyl) propionate (IRGANOX 1076). Specific processing stabilizers include tris-(2,4-di-tert-butylphenyl) phosphite (IRGAFOS 168) and tetrakis(2,4-di-tert-butylphenyl)[1,1-biphenyl]-4,4'-diylbisphosphonite (IRGAFOS P-EPQ). Specific light stabilizers include 2-(2H-benzotriazole-2-yl)-4,6-bis(1-methyl-1-phenylethyl)phenol (TINUVIN 234), 2-(5-chloro(2H)-benzotriazole-2-yl)-4-(methyl)-6-(tert-butyl) phenol (TINUVIN 326), 2-(2H-benzotriazole-2-yl)-4-(1,1,3,3-tetramethylbutyl)phenol (TINUVIN 329), 2-(2H-benzotriazole-2-yl)-4-(tert-butyl)-6-(sec-butyl)phenol (TINUVIN 350), 2,2'-methylenebis(6-(2H-benzotriazol-2-yl)-4-(1,1,3,3-tetramethylbutyl)phenol) (TINUVIN 360), and 2-(4,6-diphenyl-1,3,5-triazin-2-yl)-5-[(hexyl)-oxy]-phenol (TINUVIN 1577).

The additives mentioned above are preferably contained in an amount of 0.01 to 10.0%, especially 0.05 to 5.0%, relative to the weight of the polymer substrate c).

The incorporation of the additive components a) and b) and optional further components into the polymer component c) is carried out by known methods such as dry blending in the form of a powder, or wet mixing in the form of solutions, dispersions or suspensions for example in an inert solvent, water or oil. The additive components a) and b) and optional further additives may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc.), e.g. as a dry mixture or powder, or as a solution or dispersion or suspension or melt.

The addition of the additive components to the polymer substrate c) can be carried out in customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contra-rotating and co-rotating twin-screw extruders, planetary-gear extruders, ring extruders or co-kneaders. It is also possible to use processing machines provided with at least one gas removal compartment to which a vacuum can be applied.

Suitable extruders and kneaders are described, for example, in *Handbuch der Kunststoffextrusion, Vol.* 1 *Grund-* lagen, Editors F. Hensen, W. Knappe, H. Potente, 1989, pp. 3-7, ISBN:3-446-14339-4 (Vol. 2 Extrusionsanlagen 1986, ISBN 3-446-14329-7).

For example, the screw length is 1-60 screw diameters, preferably 35-48 screw diameters. The rotational speed of the screw is preferably 10-600 rotations per minute (rpm), preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The additive components a) and b) and optional further additives can also be sprayed onto the polymer substrate c). The additive mixture dilutes other additives, for example the conventional additives indicated above, or their melts so that they can be sprayed also together with these additives onto the polymer substrate. Addition by spraying during the deactivation of the polymerisation catalysts is particularly advantageous; in this case, the steam evolved may be used for deactivation of the catalyst. In the case of spherically polymerised polyolefins, it may, for example, be advantageous to apply the additives of the invention, optionally together with other additives, by spraying.

The additive components a) and b) and optional further additives can also be added to the polymer in the form of a master batch ("concentrate") which contains the components in a concentration of, for example, about 1.0% to about 40.0% and preferably 2.0% to about 20.0% by weight incorporated in a polymer. The polymer is not necessarily of identical structure than the polymer where the additives are added finally. In such operations, the polymer can be used in the form of powder, granules, solutions, and suspensions or in the form of lattices.

Incorporation can take place prior to or during the shaping operation. The materials containing the additives of the invention described herein preferably are used for the production of molded articles, for example roto-molded articles, injection molded articles, profiles and the like, and especially a fiber, spun melt non-woven, film or foam.

Thus, present invention further pertains to a molded or extruded article, a fiber, spun melt non-woven or a foam comprising the composition of the invention.

The following examples illustrate the invention but are not meant to limit the scope thereof in any manner.

Components

Polyamide 6 (PA 6): DURETHAN B40E®, Lanxess AG, Germany;

Polyamide 66 GF (PA 66 GF): ULRAMID A3EG5 (30% GF), BASF AG, Germany;

Melamine cyanurate: MELAPUR MC 50® (medium particle diameter 50 µm), Ciba Specialty Chemicals (=Ciba);

Melamine polyphosphate: MELAPUR 200®, Ciba;

Mixtures of different fatty acid salts (long chain amino): Ciba® EFKA®5054, Ciba;

Dispersant based on aliphatic polyether with acidic group: Ciba® EFKA®8530, Ciba;

Styrene maleic anhydride copolymer: SMA 1000P® SARTOMER Inc.

Test Methods to Assess Flame Retardancy

The UL 94 test is performed according to the general rules described in "*Flammability of Plastic Materials for Parts in Devices and Appliances*", 5$^{th}$ edition, Oct. 29, 1996. The ratings according to the UL 94 V test are compiled in the following table (times are indicated for one specimen):

| Rating | After-flame Time | Burning Drips |
|---|---|---|
| V-0 | <10 s | No |
| V-1 | <30 s | No |
| V-2 | <30 s | Yes |
| n.c. (=not classified) | >30 s | |

STANDARD PROCEDURE/EXAMPLES

The flame retardant additives are dry-mixed and are dried in vacuo for at least 12 hours at 90° C. The mixtures obtained are melt compounded in a co-rotating COPERION® ZSK 25 WLE twin screw extruder with exhaust unit.

Processing programme PA 6 compositions: Zones 1-11: 60, 230, 240, 245, 250→250° C.; Vacuum: <200 mbar, speed of rotation: 200 rpm, throughput=8 kg/h;

Processing programme PA 66 GF: Zones 1-11: 50, 240, 280→280° C.; Vacuum<200 mbar, speed of rotation=60 rpm, throughput=8 kg/h.

The flame retardant components are incorporated into the polymer melt through a lateral feed unit. Single extrusion experiments are carried out on a HAAKE TW-100 (see: Tables 2 and 3) counter-rotating twin screw extruder.

Processing programme PA 6 compositions: Medium temperature: 260 C.°, vacuum: <400 mbar, speed of rotation: 100 rpm, throughput: 1 kg/h.

The homogenized polymer strand is drawn off, cooled in a waterbath and then pelletized. After sufficient drying of the pellets (in vacuo, 12 hours at 90° C.) the formulations are processed at melt temperatures of 240-275° C. in an injection molding machine (ARBURG 370S ALLROUNDER) to give test specimens (UL test bar, 1.6 mm thickness; tensile impact test bars according to DIN 53448, Form A).

After conditioning for 24 hours at 25° C. and 50% relative humidity the test specimens are tested and classified on the basis of the UL 94-V (Underwriter Laboratories) test described above. The tensile impact test bars are tested in respect of tensile impact strength at room temperature (23° C.) using a ZWICK PSW 5101 test apparatus having a 25J pendulum.

Unless stated otherwise, all experiments of each series are carried out under identical conditions to ensure comparability (e.g. temperature profiles, screw geometries, addition of flame retardant additives, injection-molding parameters, etc.). All amounts are listed by their weight amounts and are based on the plastic molding composition including the flame retardant(s) and dispersants. The burning times are given as sum of burning times for 5 specimen.

TABLE 1

PA 6 Compositions (DURETHAN B40 E ®, processed on COPERION ® ZSK 25 WLE)

| Example 1 | FR-Additives | Dispersant | UL 94 | Burning times (s) | Elongation At Break |
|---|---|---|---|---|---|
| Referential Comp. 1 | — | — | n.c. | 635 | 127.2% |

TABLE 1-continued

PA 6 Compositions (DURETHAN B40 E ®, processed on COPERION ® ZSK 25 WLE)

| Example 1 | FR-Additives | Dispersant | UL 94 | Burning times (s) | Elongation At Break |
|---|---|---|---|---|---|
| Referential Comp. 2 | 9% MELAPUR MC ® | — | V-2 | 25 | 12.7% |
| Example 1 Inventive Comp. 1 | 9% MELAPUR MC ® | 1.5% EFKA 8530 | V-2 | 23 | 45.3% |

From the results reported in Table 1 it can be seen that the compositions according to the present invention provide polymers with significantly improved elongation at break without affecting the burning behaviour.

TABLE 2

PA 6 Compositions (DURETHAN B40 E ®, processed on HAAKE TW-100 extruder, Aluminiumdiethylphosphinate)

| Examples 2, 3 | FR-Additives | Dispersant | UL 94 | Burning time (s) | Tensile Impact Strength KJ/m² |
|---|---|---|---|---|---|
| Referential Comp. 1 | 10% EXOLIT OP 930 ® | — | n.c. | 133 | 421 |
| Example 2 Inventive. Comp. 1 | 9% EXOLIT OP 930 ® | 1.35% SMA 1000 P | n.c. | 110 | 767 |
| Example 3 Inventive Comp. 2 | 10% EXOLIT OP 930 ® | 1.5% SMA 1000 P | V-0 | 20 | 634 |

From the results reported in Table 2 it can be seen that the compositions according to the present invention provide polymers with significantly improved tensile impact strength.

TABLE 3

PA 6 Compositions (DURETHAN B40 E ®, processed on HAAKE TW-100 extruder)

| Examples 4, 5 | FR Additives | Dispersant | UL 94 | Burning time (s) | Tensile Impact Strength (KJ/m²) |
|---|---|---|---|---|---|
| Referent. Comp. 1 | — | — | n.c. | 635 | 1021 |
| Referent. Comp. 2 | 3% MELAPUR MC ® | — | V-2 | 8 | 762 |
| Example 4 Inventive Comp. 1 | 3% MELAPUR MC ® | 0.5% SMA 1000 P | V-2 | 24 | 1024 |
| Example 5 Inventive Comp. 2 | 3% MELAPUR MC ® | 0.44% SMA 1000 P | V-2 | 14 | 1053 |

From the results reported in Table 3 it can be seen that the formulations according to the present invention provide polymers with significantly improved tensile impact strength without affecting the burning behaviour.

TABLE 4

PA 66 GF Compositions (ULTRAMID A3EG5 ®, processed on COPERION ® ZSK 25 WLE)

| Examples 6, 7 | FR Additives | Dispersant | Intrinsic viscosity | UL 94 | Burning time (s) |
|---|---|---|---|---|---|
| Referential Comp. 1 | 20% MELAPUR 200 ® | — | 1.67 | V-1 | 76 |
| Referential Comp. 2 | 22.5% MELAPUR 200 ® | — | 1.69 | V-1 | 42 |
| Example 6 Inventive Comp. 1 | 20% MELAPUR 200 ® | 1% EFKA 5054 | 1.61 | V-0 | 24 |
| Example 7 Inventive Comp. 2 | 22.5% MELAPUR 200 ® | 1% EFKA 5054 | 1.59 | V-0 | 32 |

From the results reported in Table 4 it can be seen that the compositions according to the present invention provide polymers with flame retardant and self-extinguishing properties. Shorter burning times can be achieved and a V-0 classification using lower concentrations of MELAPUR 200®.

The invention claimed is:
1. A composition comprising
   a) at least one flame retardant selected from the group consisting of salts of phosphinic acids, where the phosphinic acids are of formulae I or II

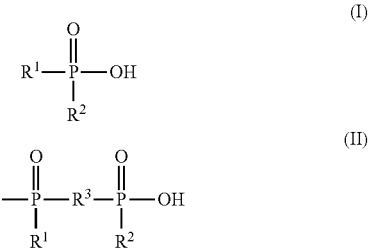

in which
   $R^1$, $R^2$ represents a linear or branched $C_1$-$C_8$alkyl radical, hydrogen, or a phenyl radical and
   $R^3$ represents a linear or branched $C_1$-$C_{10}$alkylene, arylene, alkylarylene or arylalkylene radical;
   b) at least one polymeric dispersing agent selected from the group consisting of styrene-maleic acid anhydride copolymers, and aliphatic polyethers substituted by acidic groups and
   c) a polymer substrate,
where the aliphatic polyethers substituted by acidic groups are of formula (V)

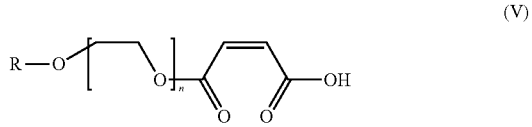

wherein R represents a $C_8$-$C_{18}$alkyl group and n represents a numeral from 5 to 10.
2. A composition according to claim 1, comprising a)

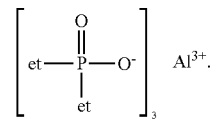

3. A composition according to claim 1, comprising b) a styrene-maleic acid anhydride copolymer of formula (X)

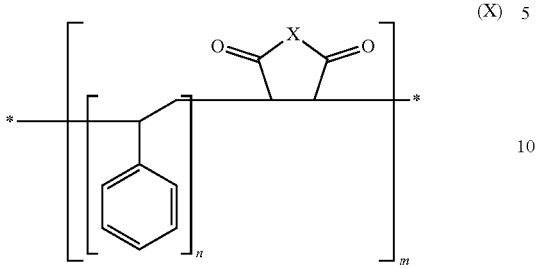

wherein —X— represents —O—, —NH— or —NR—, wherein R represents $C_1$-$C_4$alkyl or aryl, m is a numeral from 1-50 and n is a numeral from 1-5.

4. A composition according to claim 1, comprising c) a polyamide or co-polyamide derived from diamines and dicarboxylic acids or aminocarboxylic acids or the corresponding lactams.

5. A composition according to claim 1, which additionally comprises further additives selected from the group consisting of polymer stabilizers and additional flame retardants.

6. A mixture comprising
a) at least one flame retardant selected from the group consisting of salts of phosphinic acids, where the phosphinic acids are of formulae I or II

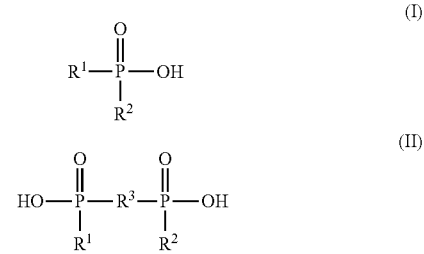

in which
$R^1$, $R^2$ represents a linear or branched $C_1$-$C_8$alkyl radical, hydrogen, or a phenyl radical and
$R^3$ represents a linear or branched $C_1$-$C_{10}$alkylene, arylene, alkylarylene or arylalkylene radical;
and
b) at least one polymeric dispersing agent selected from the group consisting of styrene-maleic acid anhydride copolymers and aliphatic polyether substituted by acidic groups
where the aliphatic polyethers substituted by acidic groups are of formula (V)

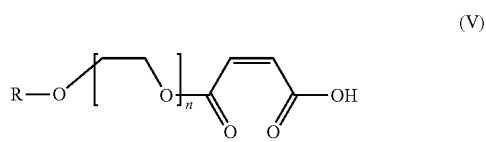

wherein R represents a $C_8$-$C_{18}$alkyl group and n represents a numeral from 5 to 10.

7. A process for imparting flame retardancy to a polymer substrate, which process comprises adding to a polymer substrate the mixture according to claim 6.

8. A composition comprising
a) at least one flame retardant selected from the group consisting of nitrogen containing compounds,
b) an aliphatic polyether substituted by acidic groups of formula (V)

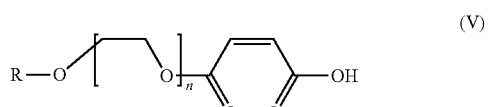

wherein R represents a $C_8$-$C_{18}$alkyl group and n represents a numeral from 5 to 10
and
c) a polymer substrate.

9. A composition according to claim 8 comprising a) a nitrogen containing compound selected from the group consisting of ammonium polyphosphate, melamine polyphosphate, melamine ammonium phosphate, melamine ammonium polyphosphate, melamine ammonium pyrophosphate, a condensation product of melamine with phosphoric acid, other reaction products of melamine with phosphoric acid and mixtures thereof.

10. A composition according to claim 8 comprising a) melamine cyanurate.

11. A composition according to claim 8, comprising c) a polyamide or co-polyamide derived from diamines and dicarboxylic acids or aminocarboxylic acids or the corresponding lactams.

12. A composition according to claim 8, which additionally comprises further additives selected from the group consisting of polymer stabilizers and additional flame retardants.

13. A mixture comprising
a) at least one flame retardant selected from the group consisting of nitrogen containing compounds,
b) an aliphatic polyether substituted by acidic groups of formula (V)

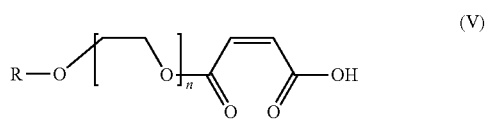

wherein R represents a $C_8$-$C_{18}$alkyl group and n represents a numeral from 5 to 10
and
c) a polymer substrate.

14. A process for imparting flame retardancy to a polymer substrate, which process comprises adding to a polymer substrate the mixture according to claim 13.

15. A composition according to claim 8 comprising
a) melamine cyanurate,
b) an aliphatic polyether substituted by acidic groups of formula V

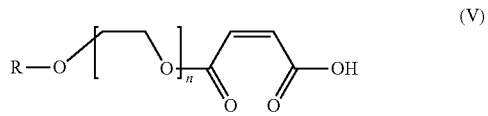

wherein R represents a $C_8$-$C_{18}$ alkyl group and n represents a numeral from 5 to 10 and c) a polyamide or co-polyamide derived from diamines and dicarboxylic acids or aminocarboxylic acids or the corresponding lactams.

16. A composition according to claim 8 comprising b) an aliphatic polyether substituted by acidic groups of formula V

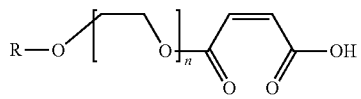
(V)

wherein R represents a $C_8$-$C_{18}$ alkyl group and n represents a numeral from 5 to 10.

17. A composition according to claim 1 where the phosphinic acid salts are of formula (I')

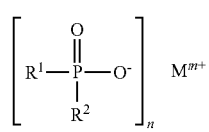
(I')

in which $R^1$, $R^2$ represents a linear or branched $C_1$-$C_8$ alkyl radical, hydrogen, or a phenyl radical and $R^3$ represents a linear or branched $C_1$-$C_{10}$ alkylene, arylene, alkylarylene or arylalkylene radical M represents $(C_1$-$C_4\text{alkyl})_4 N$, $(C_1$-$C_4\text{alkyl})_3 NH$, $(C_2$-$C_4\text{alkylOH})_4 N$, $(C_2$-$C_4\text{alkylOH})_3 NH$, $(C_2$-$C_4\text{alkylOH})_2 N(CH_3)_2$, $(C_2$-$C_4\text{alkylOH})_2 NHCH_3$, $(C_6H_5)_4 N$, $(C_6H_5)_3 NH$, $(C_6H_5CH_3)_4 N$, $(C_6H_5CH_3)_3 NH$, $NH_4$, an alkali metal or earth alkali metal ion or an aluminium, zinc, iron or boron ion;

m is a numeral from 1-3 and indicates the number of positive charges on M; and n is a numeral from 1-3 and indicates the number of phosphinic acid anions corresponding to $M^{m+}$.

18. A composition according to claim 1, comprising b) aliphatic polyethers substituted by acidic groups.

* * * * *